May 7, 1963   N. MARCHAND   3,089,086
NON-SCAN SPECTRUM ANALYZER
Filed April 17, 1958   2 Sheets-Sheet 1
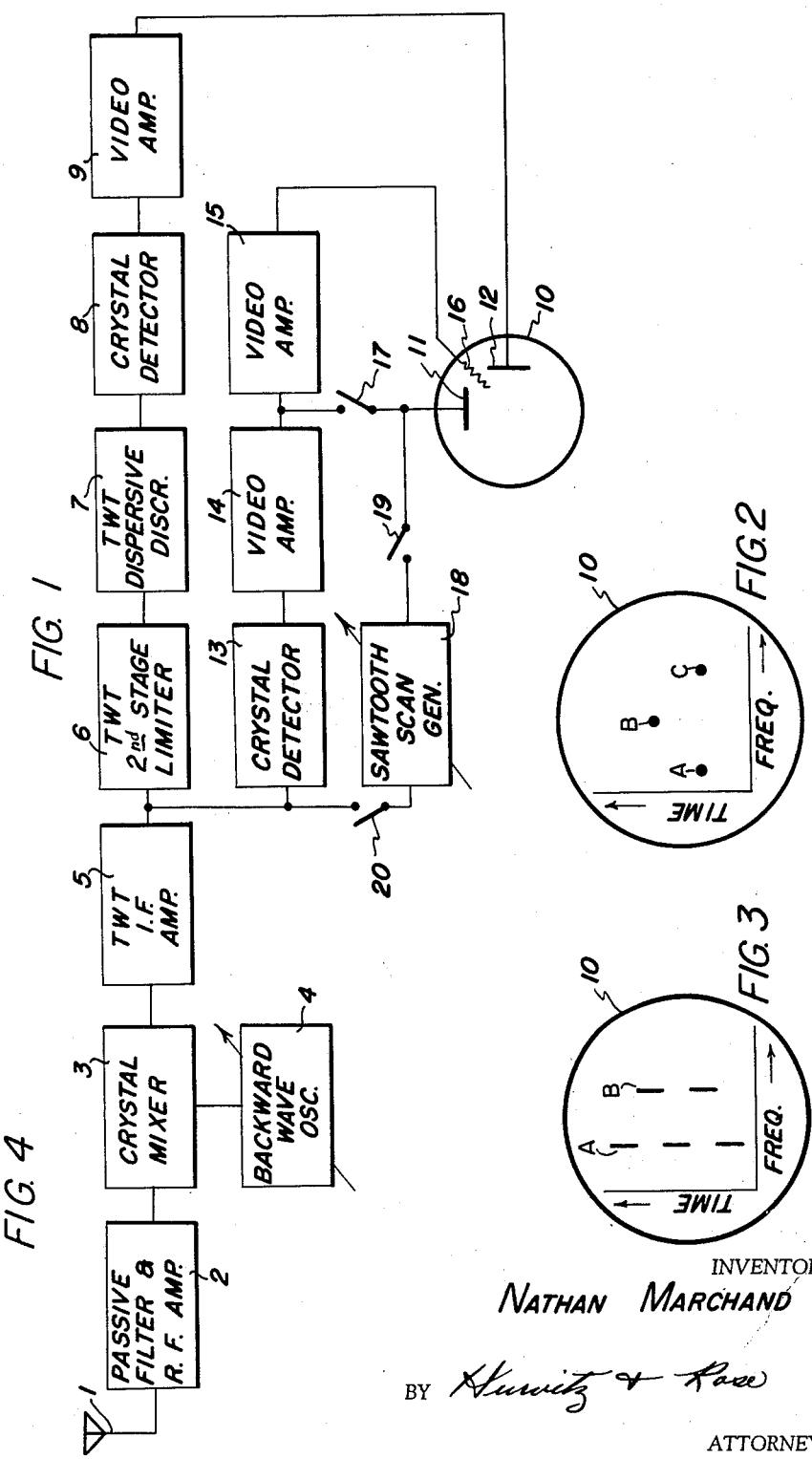
INVENTOR
NATHAN MARCHAND
BY Hurwitz & Rose
ATTORNEY United States Patent Office 3,089,086
Patented May 7, 1963

3,089,086
NON-SCAN SPECTRUM ANALYZER
Nathan Marchand, Greenwich, Conn., assignor, by mesne assignments, to The Singer Manufacturing Company, a corporation of New Jersey
Filed Apr. 17, 1958, Ser. No. 729,168
11 Claims. (Cl. 324—77)

The present invention relates generally to radio frequency spectrum analyzers, and more particularly to radio frequency spectrum analyzers of the non-scanning type designed for operation in the S band region.

It is known in the art of radio frequency spectrum analysis to measure carrier frequencies of pulses by limiting the amplitudes of the pulses, and applying the amplitude limited pulses to a frequency discriminator. The output of the latter then provides signals having amplitudes as a monotonic function of frequency, which are suitable for generating a plot of frequencies of signals in a wide spectrum. Such systems involve the problem of providing a simple and reliable discriminator having adequate band-width, at the frequencies involved, and the problem of providing an accurate amplitude limiter having adequate dynamic range.

Especially in the kmc. range of frequencies no adequate discriminator or limiter has heretofore been available.

It is known that travelling wave tubes (TWT) have a dispersive region of response, i.e., that for a wide range of frequencies such tubes provide an output which is a fairly linear function of input frequency, and which is in any event a monotonic function of frequency. The dispersive region of such tubes may extend over a 2 to 1 range in the kmc. S band, say from 2–4 kmc.

A further problem which must be solved, in a satisfactory S band non-scan spectrum analyzer system, is the problem of limiting amplitude precisely over the band of interest, and with adequate dynamic range. The travelling wave tube provides a solution of this problem, in that such tubes may be operated at saturation, to obtain a flat power-input to power-output curve. By employing two cascaded limiter stages, a flatness of about ½ db may be obtained with a 45 db dynamic range.

It is accordingly a broad object of the present invention to provide as a frequency discriminator in a non-scanning radio frequency spectrum analyzer system, a dispersive travelling wave tube.

It is another object of the present invention to provide as a limiter-discriminator in a non-scanning radio frequency spectrum analyzer system, one or more travelling wave amplifier tubes operating in the region of saturation constituting a limiter, followed by a dispersive travelling wave tube, constituting a discriminator.

It is still a further feature of the invention to provide a novel S band spectrum analyzer of the non-scan type, wherein pulsed carrier signals occurring at random times and at random frequencies are received and converted to corresponding times signals having amplitudes corresponding with the frequencies, by means of travelling wave tube limiters and discriminators.

It is another object of the present invention to provide a method of measuring frequency of a signal comprising limiting the amplitude of the signal to a predetermined value, applying the amplitude limited signal to a dispersive travelling wave tube, and visually displaying the amplitude of response of the latter against a suitably calibrated scale.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a system according to the present invention;

FIGURE 2 is a representation of a display generated by the system of the present invention, wherein amplitudes of pulses are plotted as a function of frequency;

FIGURE 3 is a representation of the face of a display device, indicating the character of a display generated by a system according to the present invention, wherein pulse duration and pulse time spacing are plotted as a function of frequency;

FIGURE 4 is a block diagram of a portion of a system according to the invention, indicating a modification of the system of FIGURE 1 which is essentially non-tunable;

Figure 5:
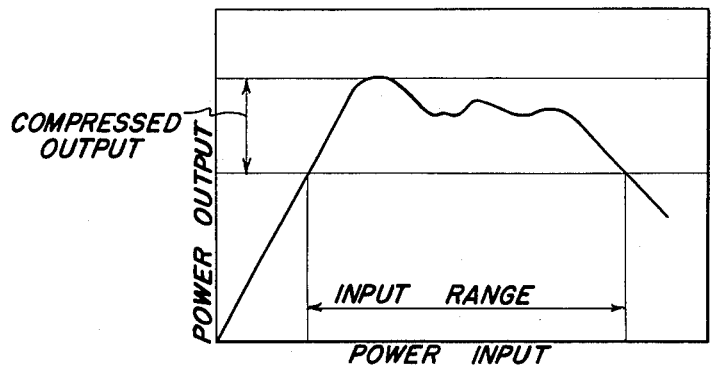
FIGURE 5 is a plot of power input against power output for the first stage of a two stage limiter utilized in the systems of FIGURES 1 and 2.

Referring now more specifically to FIGURE 1 of the accompanying drawings, the reference numeral 1 denotes an intercept antenna, of the broad band type, operating in the S band region, say about 21–23 kmc. The signals intercepted by antenna 1 may be pulsed carriers, in the region specified.

Signals intercepted by antenna 1 are amplified in an R.F. TWT amplifier 2, if amplification is required, and the output of the latter applied to a crystal mixer 3. To the latter is also applied heterodyne oscillations derived from a tunable backward wave oscillator 4. The crystal mixer 3 generates a difference or I.F. frequency, which may fall in the 2–4 kmc. S band region, for example. The I.F. frequency may be amplified in a TWT amplifier 5, and the output of the latter applied to a TWT limiter, or to several such limiters in cascade, 6. Limiting action is obtained by driving the TWT limiters to saturation.

At the output of the limiter 6 exist pulsed I.F. signals falling in the frequency range 2–4 kmc., and all of substantially uniform amplitude. These pulsed I.F. signals are applied to a TWT dispersive amplifier discriminator 7, which generates amplitude of response to each input pulse which is a monotonic function of the frequency of that pulse. Response of this type may be obtained over an octave of frequencies available in TWT dispersive amplifiers.

The amplitude modulated output derived from the discriminator 7 is detected in a crystal detector 8, and thereafter amplified in a video detector 9, prior to application to a display device 10.

The latter may be a conventional cathode ray tube indicator, having vertical deflection elements 11 and horizontal deflection elements 12. In such case the output of video amplifier 9 may be applied to the horizontal deflection electrodes 12, providing a horizontal deflection of the beam of the indicator 10 which is a monotonic function of frequency.

If it is desired to provide a plot of frequencies vs. amplitudes of received pulsed signals the output of the TWT I.F. amplifier 5 is amplitude detected in a crystal detector 13. The amplitudes of outputs of detector 13 follow a monotonic function of the amplitudes of input signals, irrespective of frequencies, and are amplified in a suitable video amplifier 14 prior to application to the vertical deflection electrode 11.

In operation, then, when an input pulse is received, the beam of the indicator 10 is deflected vertically in response to and as a monotonic function of the input pulse amplitude, and horizontally in response to and as a function of the input pulse carrier frequency. During the deflection process the beam of the indicator 10 moves too rapidly to write. Once the deflection has been completed, the beam remains stationary for a short time, while maximum signal is applied to intensity control grid 16, and a display is generated.

The appearance of an amplitude-frequency display in response to three pulses A, B and C, of different frequencies and amplitudes is presented in FIGURE 2 of the accompanying drawings. By proper selection of writing speed of the system, each received pulse may be caused to generate only a dot in the display, rather than a line representative of the path of the beam of the display device in proceeding from its "no signal" position to its signal responsive position.

The amplifier 15 may be operated in any one of several ways. It may for example by being normally operated adjacent to cut off, and the control electrodes 16 may be operated at such potential in the absence of signal applied to the input of video amplifier 15 that no visible display is generated, or so that only a slight visible display is generated. In response to a pulse signal input to video amplifier 15 intensifying signal is applied to control electrode 16, to effect generation of a display. It follows that the face of the display tube 10 is blank or substantially blank in the absence of incoming signals, and that each incoming signal generates a bright dot or line on the face of the indicator. The writing speed of the indicator of the system may be such that both vertical and horizontal deflections of a beam of the display device 10 to final position are essentially completed before sufficiently intensified signal is applied to intensify the control grid 16 to effect generation of a visible display. The net result is that the path of travel taken by the beam in arriving at its final position, representative of both frequency and amplitude of an incoming pulse, not visible and that each incoming pulse generates in terms of visible display, only a dot, the horizontal position of which represents frequency of the pulse and the vertical position of which represents amplitude of the pulse.

Application of output from the video amplifier 14 through the vertical deflection electrodes 11 may be avoided by opening the switch 17. This does not, however, disable the video amplifiers 14 and 15, so that intensification of the beam of the indicator 10 occurs in response to each received signal regardless of the open or closed position of the switch 17.

A sawtooth scan generator 18 is provided, which may be connected via a switch 19 to the vertical deflection electrode 11. The sawtooth scan generator may be free-running when a switch 20 is open, or synchronized in response to input pulses when the switch 20 is closed. The switch 20 may be closed, for example, when a single frequency is of interest, as evidenced by the character of the generated display, and in such case, the period of the sawtooth scan generator may be so adjusted that each incoming pulse sets off the scan or that each second, third, etc. pulse sets off the scan. In such case the duration of each received pulse may be indicated in terms of vertical length of the display and/or pulse spacing may be indicated. When, however, more than a single transmission is being intercepted, and when the pulses are consequently being received at random, relative to one another, the sawtooth generator 18 may be operated with the switch 20 open i.e., in free-running condition. Its frequency may then be adjusted to provide a display of frequency against time, pulse separation against time, pulse duration against time, or combinations of these, for any one of the pulse sequences.

The appearance of a typical frequency vs. time plot is represented in FIGURE 3 of the accompanying drawings, wherein two different signals A and B are being received, these signals having not only different frequencies but different pulse durations, and pulse separations.

If the time scan provided by the generator 18 is sufficiently long in relation to time of separation between pulses and pulse width, a number of pulses may be simultaneously displayed along a vertical direction. So, in the case of the signal A three pulses are displayed, and in the case of the transmission B two pulses are displayed. This type of display is particularly valuable where the transmissions are not continuous, but consist of single pulses transmitted at relatively infrequent intervals, or of short bursts of pulses transmitted at relatively infrequent intervals.

The system of the present invention is operated for the reception of multiple transmissions, at different frequencies by virtue of the following considerations:

The dispersive discriminator 7 is essentially a circuit which has a different amplitude of response to different frequencies of input. Discriminators of this type are theoretically operative only for inputs which consist of a single sinusoidal component. This characteristic is due to the integrating nature of the usual output circuit employed, which is a linear amplitude detector of the variety usually employed, and which averages the envelope present at the output terminals of the filter without regard for the Fourier components present. This output wave form is an envelope of the instantaneous vector sum of the several discrete frequency components present, when more than one discrete component is applied to the filter at a given time. In the case of short pulse lengths, the chances of coincidences between pulses receptions is low and the problem of multiple frequency reception simultaneously is not an urgent one. During coincidence of pulses of different frequencies, conflict is resolved by means of the limiter, which rejects the weaker signal. The limiter clips the peak to peak amplitudes of the incoming signals and in the ideal maintains a constant output level regardless of the variation of input level. The input wave form is of course distorted by the limiting process, but the frequency components generated by the limiting process and which represent distortion are harmonic to the input frequencies, in the case of the single frequency input, and since the nearest distortion component is an octave above the lowest desired signal or true signal, the range of the system is limited to one octave. So long as the system covers only a single octave, distortion frequencies are eliminated from the output of the system.

When the input channel is fed, for example, with two discrete frequencies simultaneously, and each of these lies within the so-called linear range of the discriminator, it is necessary to analyze the result and effect of impressing the composite wave form. Since the limiter circuit acts upon the amplitude characteristic, it is convenient to consider the latter in terms of its phasor composition instead of as a harmonic series. The two frequencies postulated may be thought of as rotating phasors of slightly different angular velocities, the phasor sum of which represents the amplitude and relative phase of the resultant. Because of the constant frequency difference the two component phasors change in angular phase with relation to one another at a constant rate and the resultant is a phasor of varying amplitude and phase, the phase oscillating about a mean phase which is determined by the larger phasor of the two, but having a maximum phase displacement with respect to the phasor of larger amplitude which equals plus or minus 45°.

If the resultant is limited, and thereafter applied to a discriminator, the resultant output will be dependent upon the relative magnitudes of the original components. The discriminator detects frequency only. If the limiting is sufficiently complete to eliminate all amplitude variations from the resultant, the discriminator will indicate the rate of change of an angular quantity which is phase modulated at the beat rate. In other words, the indicated frequency will vary at a rate equal to the difference frequency of the two input signals, over a range which includes the constant frequency of the larger components. But where one component is considerably smaller than the other, this variation will be substantially symmetrical about the frequency of the larger.

Qualitatively, this means that the limiter modifies the response so that the impression of several signals of different frequency at the input does not necessarily result in the failure of the circuit as a frequency detector, the strongest signal tending to predominate and suppress all weaker ones, and error occurring only within certain ranges of component amplitude relations.

In the case of pulse reception the probability of simultaneous reception is reduced to an extent dependent upon pulse lengths and pulse repetition rates. Also, because the signals are repetitive, even though some pulses are dropped because of interference, both signals may be closely defined in the case of two receptions, both of which are pulsed at different repetition rates, or which are non-synchronous.

While the system of FIGURE 1 is of the superheterodyne type, i.e., it involves a frequency conversion step prior to an I.F. amplifier, the system of the present invention may be employed without the superheterodyne conversion. A system of this type is illustrated in FIGURE 4 of the accompanying drawings, wherein is provided an antenna 30 which feeds signal to a passive filter 31, and thereafter in cascade to a travelling wave tube pre-amplifier 32. The output of the pre-amplifier 32 is then fed to the two stage limiter and a dispersive discriminator, the remainder of the circuitry corresponding to that illustrated in FIGURE 1 of the accompanying drawings.

The pre-selector employed in the system may be designed to exclude saturating or other disturbing signals outside of the range for which the system has been designed. These pre-selectors may include travelling wave tube octave amplifiers. On the other hand pre-selection may be sufficiently available in some cases in terms of passive filters with good enough skirt selectivity to reject signals outside the band of interest. Following the pre-selector in each case is a low noise travelling wave amplifier which linearily amplifies the incoming signals. This amplifier provides the incoming signals at a sufficiently high amplitude to assure that limiting will take place in the following two stage travelling wave tube amplifier.

The wide band amplitude detectors and the video amplifiers employed may be conventionally designed crystal video detectors and video amplifiers. However, the amplifiers may be designed with a logarithmic characteristic in order to provide a great dynamic range.

In a preferred embodiment of the present invention, the system may be designed to cover a two to four kilomegacycle range as a single band. In such case, and referring specifically to FIGURE 1, the I.F. amplifier 5 and the following limiter stages 6 and dispersive discriminators 7 may be designed for the two to four kilomegacycle range, while the heterodyning device antecedent to the I.F. amplifier 5 may convert any desired band to the specified range. In the case of the system of FIGURE 4, the entire system may be designed for the one frequency band of interest.

In each of the systems, it is found that skirt selectivity provided by travelling wave tube amplifiers alone is insufficient to prevent strong signals from outside of the band of interest from entering and capturing the receiver. In order to prevent this occurrence a fixed tuned broad band passive filter is included. This filter may be of the strip line type in order to minimize size and weight.

Amplifiers employed for the band two to four kilomegacycles may employ the Huggins HA–11 low noise travelling wave tube. These tubes provide a frequency coverage of two to four kilomegacycles, with a small signal gain of 30 db. The noise figure is 15 db maximum and the maximum power output available is 19 milowatts. The sensitivity of the receiver is then determined by the amplifier characteristics as these exist precedent to the dispersive limiters of the system. The thermal noise level at room temperature is −114 dbm. per mc. The 2,000 megacycle band width increases this level by 33 db to a value of −31 dbm. Furthermore the 15 db noise figure degrades this to −66 dbm. Assuming that we need a minimum 3 db. signal-to-noise ratio for good operation, the minimum detectable signal to −63 dbm. Tests with the Huggins tube indicate that in fact the recited calculations are quite conservative and that the minimum detectable signal would be approximately −70 dbm.

Figure 6:
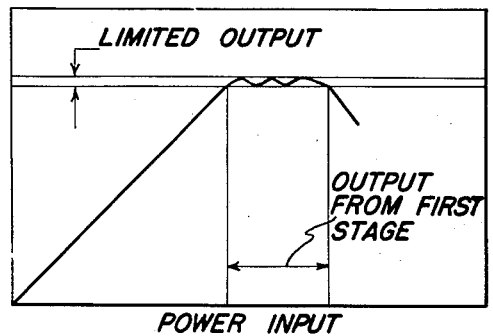
FIGURE 6 is a plot of power input against power output for the second stage limiter of the present system.
Figure 7:
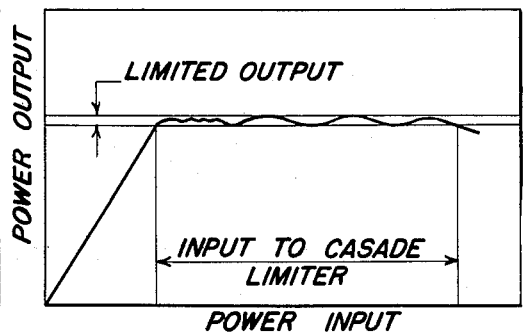
FIGURE 7 is a plot of power input against power output for both stages of the limiter system employed in the present invention.

The two stage limiter is made up for two TWT, two to four kmc. amplifiers. Normally, the power input to power output characteristic of a TWT amplifier is such that as the power input increases the power output will increase linearly to the saturation point. Any further increase in power input will result in a reduced power output. It has, therefore, been found necessary to cascade two TWT's in order to get good amplitude limiting with wide amplitude variations in input signal. The limiter stages will utilize in a preferred embodiment of the invention, two Sylvania type 6493 TWT amplifiers. Reference is made to FIGURE 5 of the accompanying drawings, wherein is shown a plot of power input to power output over a specified input range of power. It will be observed from this plot that inadequate amplitude limiting is obtained from a single limiter tube. In FIGURE 6 is shown a plot of power input to power output for the second stage of the two stage limiter, which is required to handle only a small range of inputs. FIGURE 7, shows the combined characteristic of the two limiter stages for the same input range as indicated in FIGURE 5. It will be observed that excellent limiting is obtained for the two cascaded stages.

Figure 8:
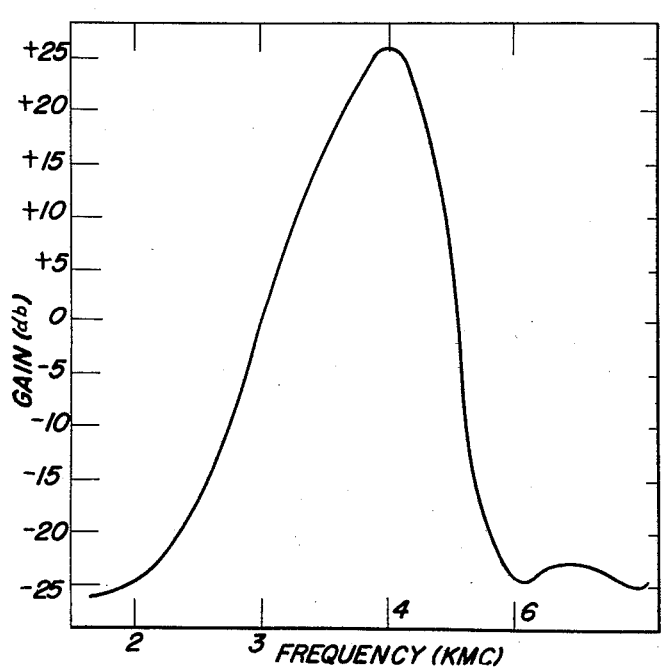
FIGURE 8 is a plot of frequency against gain for a dispersive TWT (traveling wave tube) amplifier employed as a frequency discriminator in the practice of the invention.

The dispersive discriminator 7, employs a voltage tuned TWT amplifier which is so tuned that the peak in the gain frequency characteristic occurs at one end of the band of interest, and specifically at the high end. The frequency characteristic of the amplifier is indicated in FIGURE 8, as a plot of gain of the amplifier stage, taken as a function of frequency. It will be observed that by placing the peak of the amplifier response at 4 k.m.c., that a reasonable approach to linearity is obtained for the band two to four k.m.c., and that in any event the response is monotonic. The dispersive amplifier may employ the Huggins type DHA–1 TWT in cascade with an IN32 crystal detector. As illustrated in FIGURE 8 of the accompanying drawings, the gain variations will be from −25 db to +25 db across the band of interest. The maximum power output at 4 k.m.c. is 15 dbm. Since the dispersive TWT amplifier is driven with constant amplitude signals by the limiter, the output of the dispersive amplifier will be a function of frequency alone.

The time base generator 18 is employed to sweep the beam of the indicator 10 vertically at a constant velocity while signals are being received. In this manner time relationships as well as the frequencies of the incoming signals may be indicated. In order to indicate specific repetitive pulses, the vertical scan rate may be made continuously variable and the rate may be calibrated, so that the vertical motion of indicated repetitive pulses may be stopped while indispersed pulses being received as well.

To study individual pulse duration and frequency, the indicator is used as a synchroscope by closing the switch 20 as well as the switch 19, so that the vertical sweep may be triggered by incoming signals, and a calibrated vertical scale may be used to measure pulse duration or to differentiate between pulses of different furations.

The system of the present invention may be utilized also to indicate the center of gravity of noise bands being received. This renders the system of particular utility in counter measures, i.e., when an enemy may be transmitting wide band noise signals in an attempt to jam radar. In analogous fashion the system may be used for placing on frequency a wide band noise transmitter designed for jamming enemy radar, and in such case, and assuring a single enemy transmission will present a plot on a given lateral position on the cathode ray tube indicator. The noise signal which is generated will similarly present a single frequency appearance, at the center of gravity of the jamming signal which may be centered precisely on the mean frequency of the received enemy radar signal, whereby maximum jamming effect may be attained.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What is claimed is:

1. A non-scan spectrum analyzer, comprising a source of signals falling within a predetermined radio frequency spectrum, means for limiting the amplitudes of said signals to a level value irrespective of frequencies of said signals, said last means including a travelling wave tube amplifier driven to saturation by each of said signals, and a discriminator being coupled in cascade to said means for limiting, said discriminator being a dispersive travelling wave amplifier tube having a gain vs. frequency response of only one slope direction within the predetermined spectrum.

2. The combination according to claim 1, wherein is further provided a cathode ray tube display device having means for generating a cathode ray beam, and means for deflecting said beam in a first direction in response to signal output derived from said discriminator.

3. A display system for pulse signals occurring at various frequencies and at various times in a predetermined frequency spectrum, comprising, a translation channel for said signals, said translation channel having an output circuit, a limiter and frequency discriminator coupled in cascade to said output circuit to receive signals therefrom, said limiter comprising at least two cascaded limiter stages, each of said limiter stages including a travelling wave amplifier driven to saturation in response to signals provided by said translation channel, said frequency discriminator comprising a travelling wave tube operating in its dispersive region, a visual indicator for providing voltage responsive deflectable visual indications in at least two coordinate directions, means for deriving first voltages from said frequency discriminator representative of only the frequencies of said signals, at least one of said traveling wave amplifiers having a bandpass for maintaining the signal supplied to said discriminator only within frequencies lying in the gain vs. frequency characteristic of a single slope direction of said discriminator traveling wave tube, means for applying said first voltages to said visual indicator to actuate said visual indications in one of said coordinate directions, means for deriving further voltages representatve of a pulse shape characteristic of said signals directly from said translation channel and means for applying said further voltages to said visual indicator to actuate said visual indication in another of said coordinate directions.

4. The combination according to claim 3 wherein said characteristic of a signal is pulse amplitude.

5. The combination according to claim 3 wherein the said characteristic of a signal is pulse duration.

6. The combination according to claim 3 wherein said characteristic of a signal is pulse duration and time separation.

7. In combination, in a system for indicating the frequency and a further information bearing characteristic of each of a plurality of pulse modulated wave energy signals occupying positions within a predetermined frequency spectrum, a channel for passing all said signals, said channel having an output circuit, an amplitude limiter coupled to said output circuit for limiting the amplitudes of all said wave energy signals, said amplitude limiter comprising a travelling wave tube amplifier operating in its saturation region, a frequency discriminator coupled to said amplitude limiter for providing first voltage outputs of different magnitudes in response to wave energy signals of different frequencies, said frequency discriminator comprising a travelling wave tube amplifier operating in its dispersive region, said traveling wave tube amplifier included in said limiter having a bandpass for maintaining the signal supplied to said traveling wave tube amplifier of said discriminator within a range of frequencies such that the amplitude output of said frequency discriminator is monotonic as a function of frequency, a pulse amplitude detector coupled to said output circuit for deriving further voltage output representative of said information bearing characteristic of said signals, and means for indicating the first and further voltage representative of each of said modulated wave energy signals as a unitary indication in separate coordinate directions representative separately of said first and further voltages.

8. In combination a signal translating channel capable of passing a plurality of pulse information bearing signals, a limiter for said signals coupled to said translating channel, said limiter including at least one travelling wave tube amplifiers operated in its saturation region, a frequency discriminator circuit for said signals coupled to said limiter in cascade therewith, said frequency discriminator circuit comprising a travelling wave tube amplifier operating in its dispersive region, said at least one traveling wave tube amplifier included in said limiter having a bandpass for maintaining the signals supplied to said traveling wave tube amplifier of said discriminator within a range of frequencies such that the amplitude output of said discriminator traveling wave tube amplifier is monotonic as a function of frequency, a visual indicator adapted to produce simultaneous visual indications in at least two coordinates, means responsive to the output of said discriminator for providing an indication of pulse carrier frequency only in one of said coordinates, means for deriving further information bearing signals indicative of enevelope shape of said pulse in formation bearing signals directly from said translating channel and means for actuating said indicator in another of said at least two coordinates to provide further visual indications responsive to said last mentioned information bearing signals, said last means comprising means for deflecting said indication in the second of said two coordinates as a function of time.

9. A display system for amplitude modulated carrier signals occurring at various carrier frequencies in a predetermined frequency spectrum, comprising a translation channel for said signals, said translation channels having an output circuit, a limiter and frequency discriminator coupled in cascade to said output circuit to receive signals therefrom, said limiter comprising two cascaded travelling wave tube amplifiers, each operating in its saturation region, said frequency discriminator comprising a travelling tube wave amplifier operating in its dispersive region, said at least one traveling wave tube amplifier included in said limiter having a bandpass for maintaining the signals supplied to said traveling wave tube amplifier of said discriminator within a range of frequencies such that the amplitude output of said discriminator traveling wave tube amplifier is monotonic as a function of frequency, a visual indicator for providing voltage responsive deflectable visual indications, means for deriving first voltages from said frequency discriminator representative of the frequency of said carrier signals, means for applying said voltages to said visual indicator to deflect said visual indications in a first coordinate direction, means for deriving further voltages representative of pulse duration and spacings of said signals, and means for applying said further voltages to said visual indicator to deflect said visual indications in a second coordinate direction as a function of time.

10. In combination a frequency limiter and discriminator for wide band signals in the S band region, comprising a pair of cascaded travelling wave tube amplifiers operating each in its saturation region, a source of signals, means for applying said signals to said cascaded limiter stages to a level adequate to drive each of said limiter stages into its saturation region, another travelling wave tube amplifier coupled in cascade to said limiter stages, said travelling wave tube amplifier being arranged and adapted to operate in its dispersive region, and at least one of said pair of traveling wave tube amplifiers having a bandpass for maintaining the signal supplied to said another traveling wave tube amplifier within a portion of said dispersive region selected to provide a monotonic amplitude of response as a function of input frequency.

11. The combination of claim 10 wherein the discriminator comprises a crystal detector responsive to the output signal of said another traveling wave tube.

References Cited in the file of this patent

UNITED STATES PATENTS

| | | |
|---|---|---|
| 2,402,421 | Lindenblad | June 18, 1946 |
| 2,479,222 | Edlen | Aug. 16, 1949 |
| 2,480,799 | White | Aug. 30, 1949 |
| 2,556,377 | Robertson | June 12, 1951 |
| 2,616,990 | Knol et al. | Nov. 4, 1952 |
| 2,623,193 | Bruck | Dec. 13, 1952 |
| 2,704,806 | Wallace | Mar. 22, 1955 |
| 2,704,807 | Wallace | Mar. 22, 1955 |
| 2,704,808 | Wallace | Mar. 22, 1955 |
| 2,831,147 | Weber | Apr. 15, 1958 |
| 2,843,733 | Harrison | July 15, 1958 |
| 2,849,545 | Mendel | Aug. 26, 1958 |
| 2,882,395 | White | Apr. 14, 1959 |
| 2,897,395 | Wright et al. | July 28, 1959 |
| 2,901,698 | Tomijasu | Aug. 25, 1959 |
| 2,919,620 | Dorf | Jan. 5, 1960 |
| 2,923,882 | Bradford | Feb. 2, 1960 |
| 2,973,478 | Hurvitz | Feb. 28, 1961 |

OTHER REFERENCES

Microwave Theory and Techniques, textbook by Reich et al., published by Van Nostrand Company, Inc., copyright 1953, pages 821–835.